(12) United States Patent
Murata

(10) Patent No.: US 10,360,259 B2
(45) Date of Patent: Jul. 23, 2019

(54) CONTENT PROVIDING APPARATUS AND METHOD

(71) Applicant: Honda Motor Co., Ltd., Tokyo (JP)

(72) Inventor: Satoshi Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/839,407

(22) Filed: Dec. 12, 2017

(65) Prior Publication Data

US 2018/0173796 A1 Jun. 21, 2018

(30) Foreign Application Priority Data

Dec. 21, 2016 (JP) .................................. 2016-248022

(51) Int. Cl.
*G06F 17/00* (2019.01)
*G06F 16/635* (2019.01)
*G06K 9/00* (2006.01)
*G10L 15/02* (2006.01)
*G11B 27/00* (2006.01)

(52) U.S. Cl.
CPC ....... *G06F 16/636* (2019.01); *G06K 9/00268* (2013.01); *G06K 9/00362* (2013.01); *G06K 9/00845* (2013.01); *G10L 15/02* (2013.01); *G11B 27/00* (2013.01)

(58) Field of Classification Search
CPC .......... G06F 17/30764; G06K 9/00268; G10L 15/02
See application file for complete search history.

(56) References Cited

U.S. PATENT DOCUMENTS

| 2013/0307771 | A1* | 11/2013 | Parker | G06F 3/013 345/158 |
| 2014/0171752 | A1* | 6/2014 | Park | A61B 5/165 600/301 |
| 2015/0053066 | A1* | 2/2015 | Hampiholi | B60W 50/14 84/602 |
| 2015/0206523 | A1* | 7/2015 | Song | G10H 7/002 84/609 |
| 2017/0060521 | A1* | 3/2017 | Cellier | G06F 17/30345 |
| 2017/0102765 | A1* | 4/2017 | Yoneda | G06F 3/011 |

FOREIGN PATENT DOCUMENTS

| JP | 2006092430 A | 4/2006 |
| JP | 2006146630 A | 6/2006 |
| JP | 2006155157 A | 6/2006 |
| JP | 2012155616 A | 8/2012 |
| JP | 2016212478 A | 12/2016 |

* cited by examiner

*Primary Examiner* — Joseph Saunders, Jr.
(74) *Attorney, Agent, or Firm* — Duft & Bornsen, PC

(57) ABSTRACT

A content providing apparatus, including a biometric information acquiring unit acquiring a biometric information of a passenger, a feeling estimating unit estimating a passenger feeling based on the biometric information acquired, a content instructing unit instructing to acquire a content based on the passenger feeling estimated, a content acquiring unit acquiring the content instructed to be acquired, and a content output unit outputting the content acquired to the passenger. The content instructing unit instructs to change the content to be acquired from a first content to a second content, in accordance with the passenger feeling estimated after the first content is output.

8 Claims, 5 Drawing Sheets

US 10,360,259 B2

CONTENT PROVIDING APPARATUS AND METHOD

CROSS-REFERENCE TO RELATED APPLICATION

This application is based upon and claims the benefit of priority from Japanese Patent Application No. 2016-248022 filed on Dec. 21, 2016, the content of which is incorporated herein by reference.

BACKGROUND OF THE INVENTION

Field of the Invention

This invention relates to a content providing apparatus and method which provides music or other contents to passengers in a vehicle.

Description of the Related Art

As conventional apparatuses of this type are known ones adapted to use passenger (or driver) voices picked up by microphones to generate feelings (emotion) data representing passenger feelings, select a musical piece from a database based on the generated feelings data, and automatically reproduce the selected music. Such an apparatus is described in Japanese Unexamined Patent Publication No. 2006-155157 (JP2006-155157A), for example.

However, since passenger feelings do not always correspond well with the music or other contents they prefer, an automatic music selection service that selects music based on passenger feelings data in the manner of the apparatus of JP2006-155157A is apt sometimes to annoy passengers.

SUMMARY OF THE INVENTION

An aspect of the present invention is a content providing apparatus, including: a biometric information acquiring unit configured to acquire a biometric information of a passenger; and a CPU and a memory coupled to the CPU, wherein the CPU and the memory are configured to perform: estimating a passenger feeling based on the biometric information acquired by the biometric information acquiring unit; instructing to acquire a content based on the passenger feeling estimated; acquiring the content instructed to be acquired; outputting the content acquired by the content acquiring unit to the passenger; and the instructing including instructing to change the content to be acquired from a first content to a second content, in accordance with the passenger feeling estimated after the first content is output.

Another aspect of the present invention is a content providing apparatus, including: a biometric information acquiring unit configured to acquire a biometric information of a passenger; a feeling estimating unit configured to estimate a passenger feeling based on the biometric information acquired by the biometric information acquiring unit; a content instructing unit configured to instruct to acquire a content based on the passenger feeling estimated by the feeling estimating unit; a content acquiring unit configured to acquire the content instructed to be acquired by the content instructing unit; and a content output unit configured to output the content acquired by the content acquiring unit to the passenger, wherein the content instructing unit is further configured to instruct to change the content to be acquired from a first content to a second content, in accordance with the passenger feeling estimated by the feeling estimating unit after the first content is output by the content output unit.

Further aspect of the present invention is a content providing method, including: acquiring a biometric information of a passenger; estimating a passenger feeling based on the biometric information acquired by the biometric information acquiring unit; instructing to acquire a content based on the passenger feeling estimated; acquiring the content instructed to be acquired; outputting the content acquired by the content acquiring unit to the passenger; and the instructing including instructing to change the content to be acquired from a first content to a second content, in accordance with the passenger feeling estimated after the first content is output.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
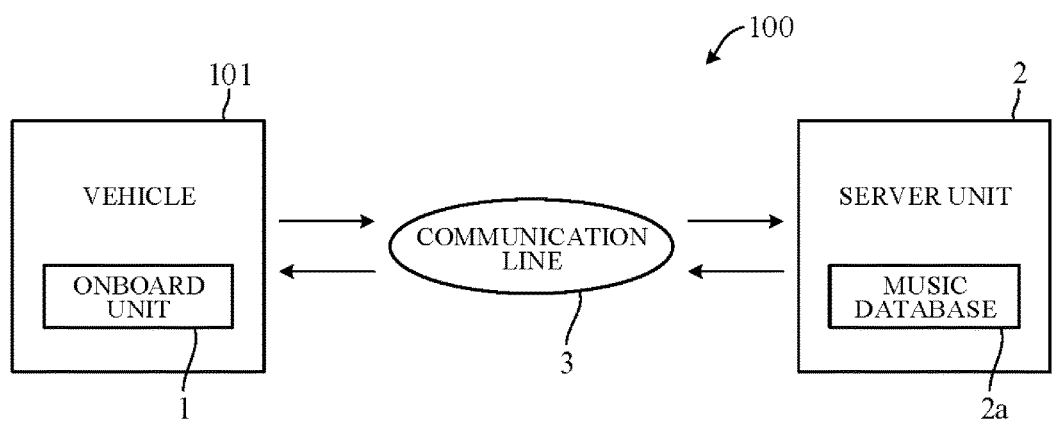
FIG. 1 is a diagram showing a configuration overview of a content providing system according to an embodiment of the present invention.

An embodiment of the present invention is explained with reference to FIGS. 1 to 7 in the following. FIG. 1 is configuration overview of a content providing system 100 according to an embodiment of the present invention. The content providing system 100 is configured to provide music data from a server unit 2 to a vehicle onboard unit 1.

As shown in FIG. 1, the content providing system 100 comprises the onboard unit 1 mounted in a vehicle (e.g., an automobile) 101 and the server unit 2 located outside the vehicle 101. The onboard unit 1 and server unit 2 are communicatably connected through a communication line 3. The communication line 3 can be established, for example, through the Internet, a wireless LAN or other network, or through a combination thereof. The onboard unit 1 mounted in the vehicle 101 and connected to the communication line 3 can be either a single unit or multiple units.

The onboard unit 1 is an example of the content providing apparatus of the present invention and is capable of receiving contents from the server unit 2 and providing them to passengers (vehicle occupants including an operator/driver). The contents received by the onboard unit 1 are, for example, music contents including music data. The music data are stored in a music database 2a of the server unit 2, and the onboard unit 1 acquires desired music data from the music database 2a. The music data are, for example, transmitted in sync with contents processing speed of the onboard unit 1, i.e., by so-called data streaming. Although not shown in the drawings, the server unit 2 has a computing unit, a communication unit and the like, and the music database 2a is configured as a memory unit.

The music data are classified and stored by music genres of different tempos and rhythms, such as jazz, pops and rock. These music genres can be further classified more finely by period as music of the 1980s, 2000s and so on, for example. The music database 2a stores music data by music genre. Each music genre contains multiple sets of music data (multiple musical pieces). The musical genres can be switched among by switching among broadcast station reception channels in the onboard unit 1. The broadcast stations include radio stations that provide musical pieces of certain music genres at any time. The music data include various types of information regarding the music contents (e.g., title, album name, artist name, and the like).

Figure 2A:
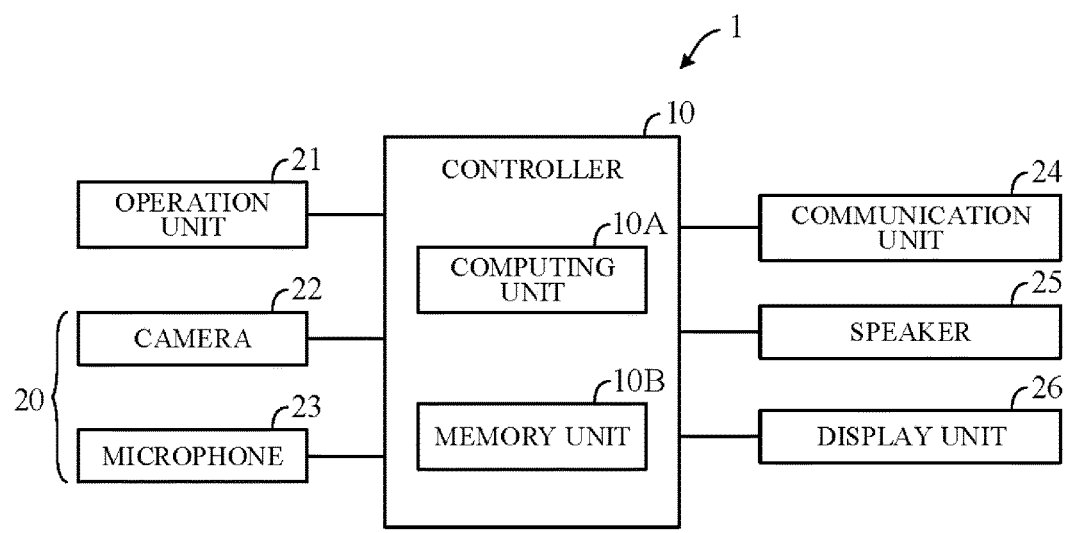
FIG. 2A is a block diagram showing a configuration overview of an onboard unit (content providing apparatus) of FIG. 1.

In actual practice, the onboard unit (content providing apparatus) 1 is configured as a navigation apparatus, audio unit or the like capable of functioning as audio equipment. FIG. 2A is a block diagram showing a configuration overview of the onboard unit 1. As shown in FIG. 2A, the onboard unit 1 comprises a controller 10, and connected to the controller 10, an operation unit 21, a camera 22, a microphone 23, a communication unit 24, a speaker 25, and a display unit 26. When the onboard unit 1 is constituted as a navigation apparatus, the onboard unit 1 has a navigation unit but illustration thereof is omitted in FIG. 2A.

The operation unit 21 is equipped with various passenger-operated switches, including, for example, an on-off switch for turning the onboard unit 1 ON and OFF, a sound volume switch for changing sound volume, a genre select switch for switching music genres (channels), a song select switch for switching among songs (musical pieces) within any selected music genre, and so on. Vehicle occupants including a driver/operator (herein called "passengers") can manually select songs by operating the genre select switch and song select switch. Alternatively, a touch panel provided on the screen of the display unit 26 can be adopted as the operation unit 21. The onboard unit 1 has a functional feature (song providing service feature) that automatically provides passengers with music (songs) in response to their feelings, but start and stop of this song providing service can be instructed by operating the operation unit 21. It is also possible to start the song providing service simultaneously with turn-on of the onboard unit 1.

The camera 22 has a CCD sensor, CMOS sensor or other image sensor that images upper body and face of passengers. In other words, the camera 22 photographs facial expression and posture of passengers. Image signals from the camera 22 can be used to infer or estimate passenger emotions (feelings).

The microphone 23 picks up voice sounds uttered by passengers. Voice signals from the microphone 23 are passed through an A/D converter, for example, and input as voice data to the controller 10, which subjects them to voice recognition. Voice signals from the microphone 23 can be used to estimate passenger feelings. The camera 22 and microphone 23, which acquire biometric information such as passenger facial expression images and passenger voices, together constitute a biometric information acquiring unit 20.

The communication unit 24 enables communication through the communication line 3 with equipment outside the vehicle, and the controller 10 can communicate through the communication unit 24 with the server unit 2 outside the vehicle. The communication unit 24 is also capable of short-range wireless communication with smartphones and other mobile terminals carried by passengers or installed inside the vehicle.

The speaker 25 is responsive to instructions from the controller 10 for outputting music contents acquired from the server unit 2. Music contents stored in advance in a memory unit 10B of the onboard unit 1 can also be output from the speaker 25. The speaker 25 can also output voice in response to a request for voice output made by a passenger through the operation unit 21 or microphone 23. Even in the absence of a request for voice output from a passenger, voice can be automatically output by a command from the controller 10.

The display unit 26 is constituted as a liquid crystal display, for example. The display unit 26 displays information relating to music contents output from the speaker 25, plus various setting information.

Figure 2B:
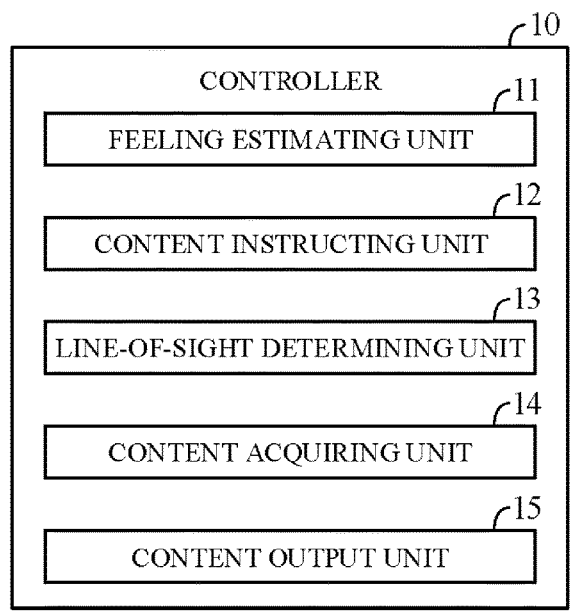
FIG. 2B is a block diagram showing functional constituents of a controller of FIG. 1.

The controller 10 is constituted as a computer comprising a CPU or other computing unit 10A, a memory unit 10B incorporating ROM, RAM and the like, and other peripheral circuits. FIG. 2B is a diagram showing functional constituents of the controller 10 (mainly the computing unit 10A). As shown in FIG. 2B, the controller 10 has a feeling estimating unit 11, a content instructing unit 12, a line-of-sight determining unit 13, a content acquiring unit 14, and a content output unit 15.

The feeling estimating unit 11 estimates feelings of passengers (passenger feelings) from passenger facial expression (mouth angle etc.) based on picture signals acquired by the camera 22. As concrete means for this, the feeling estimating unit 11 uses Plutchik's wheel of emotion, for example, to in advance classify passenger emotions into eight primary emotions (anticipation, joy, trust, fear, surprise, sadness, disgust, and anger) and secondary emotions that combine two adjacent primary emotions, compare images that represent characteristics of these emotions with images from the camera 22, and estimate passenger emotion (feelings) by matching with one of the human emotion patterns. Although various emotion patterns other than Plutchik's wheel of emotion can be applied instead as human emotion patterns, the present embodiment is explained taking Plutchik's wheel of emotion as an example. Passenger emotions (feelings) are estimated not only based on image signals from the camera 22 but also taking voice signals from the microphone 23 into consideration. Namely, passenger feelings are estimated with consideration also to gist of the passenger utterance, voice intonation and pronunciation of the utterance, and so on.

The feeling estimating unit 11 further quantifies passenger feelings based on match with the wheel of emotions. For example, feelings passengers perceive as good, such as joy or delight, i.e., pleasant feelings (favorable emotions), are assigned a positive value, and feelings passengers perceive as bad, such as disgust or anger, i.e., unpleasant feelings (unfavorable emotions), are assigned a negative value. In such case, value (absolute value) representing an emotion is, for example, increased in proportion as the emotion is stronger (as it is closer to the center of the wheel). The degree of passenger feelings (pleasant feelings, unpleasant feelings) can therefore be measured.

The content instructing unit 12 designates the kind of music contents (e.g., jazz, pops, or other music genre) to be provided to passengers in line with passenger feelings estimated by the feeling estimating unit 11. For example, interrelations between passenger feelings and music genre are recorded in the memory unit 10B of the controller 10 beforehand, and a music genre is automatically designated in line with passenger feelings based on the recorded interrelations. It is also possible to store data on music provided to passengers in the past, determine passenger preferences from such data, and designate a music genre with consideration to both passenger preferences and passenger feelings. A song within a music genre can also be designated together with the music genre.

In addition, the content instructing unit 12 can determine from passenger feelings whether provided music contents annoy the passengers, and instruct a change of music contents when displeasure is determined. Such instructions include ones for a change of song within the same music category, for a change of music category, and for stopping provision of music contents (shutdown of the content providing service). The content instructing unit 12 determines degree of passenger displeasure after providing music contents requested in line with passenger feelings estimated by the feeling estimating unit 11. For example, when degree (absolute value) of displeasure is less than a first predetermined value, change to another song in the same music genre is instructed. When degree of displeasure is equal to or greater than the first predetermined value and less than a second predetermined value greater than the first predetermined value, change to another music genre is instructed. When degree of displeasure is equal to or greater than the second predetermined value, shutdown of song providing service is instructed.

The line-of-sight determining unit 13 determines based on the image signal from the camera 22 whether a passenger is looking in a predetermined direction (e.g., toward the operation unit 21). This is done after music contents are automatically provided with consideration to passenger feelings. When a passenger looks toward the operation unit 21 after music contents were provided, the passenger can be presumed to want to change the music contents manually. This determination by the line-of-sight determining unit 13 therefore amounts to determining whether the passenger desires change of music contents. When the line-of-sight determining unit 13 determines that a passenger's eyes are focused on the operation unit 21, the content instructing unit 12 instructs change of music contents. This expedient exploits the tendency of humans who sense something counter to their intention, or feel an odd sensation, to unconsciously direct their eyes toward the cause. Therefore, while direction of line of sight toward the operation unit 21 is used as an example in this embodiment, there are also other possibilities, such as toward an anthropomorphic agent, should one be mounted in the vehicle, or toward a speaker having directivity, if one is present.

The content acquiring unit 14 acquires music data of music contents designated by the content instructing unit 12 from the server unit 2 through the communication unit 24. Namely, it acquires music data contained in the designated music genre from the server unit 2. When the content instructing unit 12 instructs change of music contents, the content acquiring unit 14 responds to the change instruction by acquiring from the server unit 2 other music data of the same music genre or music data of a different music genre. When the content instructing unit 12 instructs shutdown of song providing service, the content acquiring unit 14 discontinues acquisition of music contents.

The content output unit 15 outputs music contents from the speaker 25 in accordance with music data acquired by the content acquiring unit 14. When the content instructing unit 12 instructs shutdown of song providing service, the content output unit 15 discontinues output of music contents.

Figure 3:
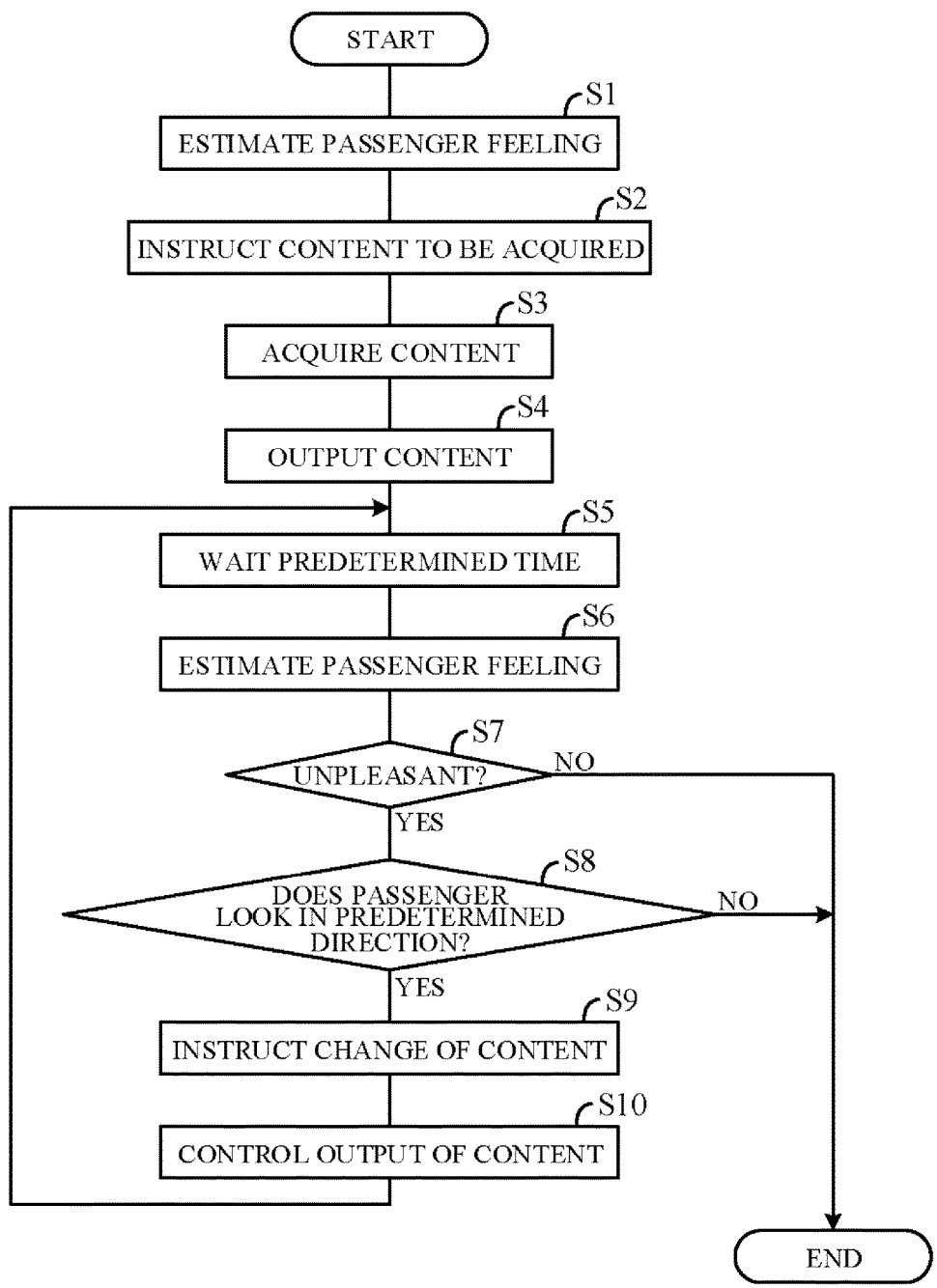
FIG. 3 is a flowchart showing an example of processing performed by a computing unit of FIG. 2A.

FIG. 3 is a flowchart showing an example of processing performed by the computing unit 10A in accordance with a program loaded in the memory unit 10B. The processing indicated by this flowchart is commenced, for example, when start of song providing service is instructed by operation of the operation unit 21.

First, in S1 (S: processing Step), the feeling estimating unit 11 estimates passenger feelings based on signals from the camera 22 and microphone 23. Next, in S2, the content instructing unit 12 designates or instructs to acquire music contents (music genre) in line with passenger feelings estimated in S1. Next, in S3, the content acquiring unit 14 acquires music data of music contents instructed in S2 from the server unit 2 through the communication unit 24.

Next, in S4, the content output unit 15 outputs music contents from the speaker 25 in accordance with music data acquired in S3. As a result, passengers are automatically provided music contents in line with passenger feelings. Next, in S5, a predetermined wait time Δt1 is allowed to pass. Predetermined time Δt1 is set to a time period required for passenger feelings to change after provision of music contents (around several seconds, for example).

Next, S6, the feeling estimating unit 11 again estimates passenger feelings based on signals from the camera 22 and microphone 23. When the estimated passenger feelings suggest displeasure, degree of displeasure is simultaneously determined. Then, in S7, the content instructing unit 12 determines whether the feelings estimated in S6 are unpleasant feelings. When the result in S7 is NO, since this means that the provided music contents offer passengers a feeling of satisfaction, change processing is discontinued because no change of music contents is necessary.

When, to the contrary, the result in S7 is YES, the program goes to S8, in which the line-of-sight determining unit 13 determines based on the image signal from the camera 22 whether a passenger is looking in a predetermined direction (toward the operation unit 21). When the result in S8 is NO, the content instructing unit 12 determines that the determination of passenger displeasure in S7 was not due to provision of inappropriate music but to some other cause and discontinues processing without changing music contents. On the other hand, when the result in S8 is YES, the content instructing unit 12 determines that the passenger displeasure was caused by the provision of inappropriate music contents, and the program goes to S9.

In S9, the content instructing unit 12 instructs change of music contents based on passenger feelings estimated in S6. Specifically, when degree of passenger displeasure determined in S6 is less than the first predetermined value, the content instructing unit 12 instructs change to other music contents in the same music genre. For example, when music contents to be provided have been put in order (song order), change to the next in line is instructed. Otherwise, change to other music contents is randomly instructed. When degree of displeasure is equal to or greater than the first predetermined value and less than the second predetermined value greater than the first predetermined value, change of music genre is instructed. In this case, which music genre to designate is decided with consideration to, for example, passenger feelings and passenger preference. When degree of displeasure is equal to or greater than the second predetermined value, shutdown of song providing service is instructed.

Next, in S10, the content acquiring unit 14 and the content output unit 15 perform processing for controlling output of music contents in accordance with the music contents instruction of S9. Specifically, when change of music contents within the same music genre is instructed in S9, other music data of the same music genre are acquired from the server unit 2 and music contents corresponding to the music data are output from the speaker 25. When change of music genre is instructed in S9, music data of another music genre is acquired from the server unit 2, and music contents corresponding to the music data are output from the speaker 25. When shutdown of song providing service is instructed in S9, output of music contents from the speaker 25 is discontinued. Next, the program returns to S5 to repeat the aforesaid processing until unpleasant passenger feelings are brightened.

Figure 4:
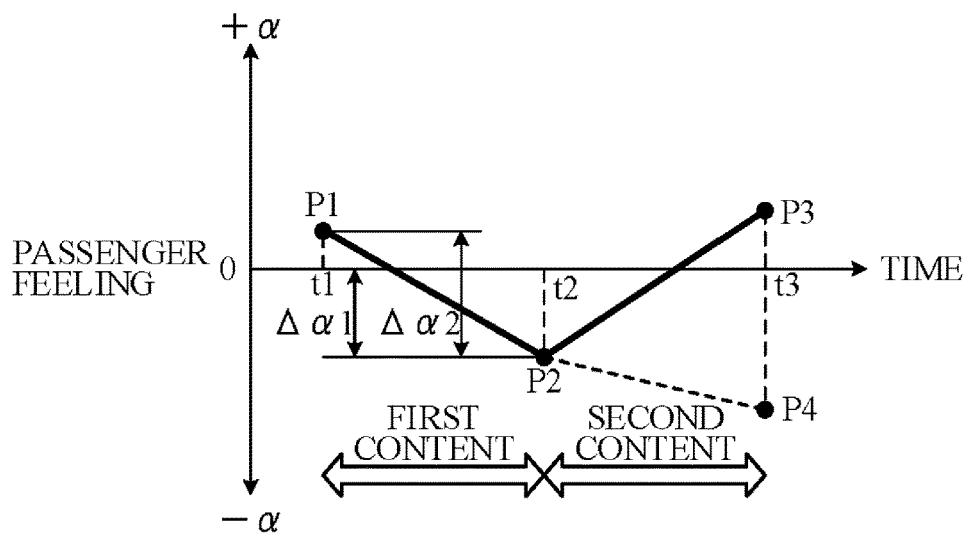
FIG. 4 is a timing chart showing an example of operation of the content providing apparatus according to the embodiment of the present invention.
Figure 5:
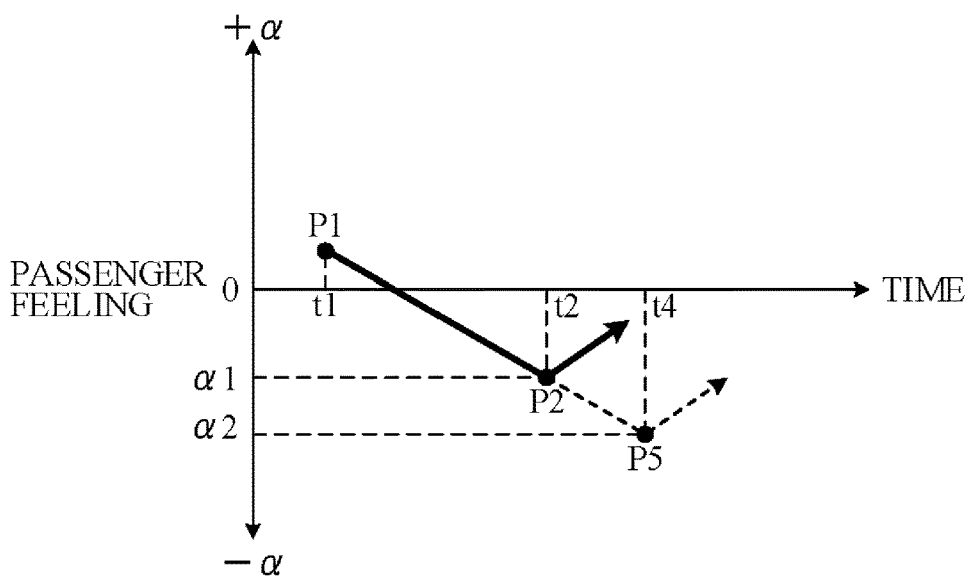
FIG. 5 is a diagram for explaining advantages and effects achieved by the content providing apparatus according to the embodiment of the present invention.

A more concrete explanation of operation of the content providing apparatus (onboard unit 1) according to the present embodiment now follows. FIG. 4 is a timing chart showing an example of operation of the content providing apparatus of this embodiment, with focus on change of passenger feelings α over time. In FIG. 4, pleasant feelings (emotions) are represented as positive and unpleasant feelings as negative.

When a passenger instructs start of song providing service at time t1 (point P1) of FIG. 4, the controller 10 immediately estimates passenger feelings α from, inter alia, passenger facial expression, automatically acquires music contents (first contents) in line with passenger feelings α from the server unit 2, and outputs the first contents from the speaker 25 (S1-S4). Therefore, the passenger can be automatically provided with music contents in line with passenger feelings α even if the passenger does not designate music contents (broadcast station channel or the like) by operating the operation unit 21.

Then, at time t2 after passage of the predetermined time Δt1 following provision of music contents, the controller 10 again determines passenger feelings α (S7). When it is determined at this time that, as indicated at time P2 in FIG. 4, the passenger has unpleasant feelings, and the passenger is looking toward the operation unit 21, the controller 10 decides music contents (second contents) to be provided to the passenger in line with degree Δα1 of the unpleasant feelings and instructs change of music contents from first contents to second contents (S9). Alternatively, the second contents can be decided in accordance with degree Δα2 of worsening of passenger feelings α from those at time t1.

When this results in degree Δα1 of passenger unpleasant feelings of less than first predetermined value, other music contents (second contents) of the same music genre are provided, and when it results in Δα1 equal to or greater than first predetermined value and less than second predetermined value, music contents (second contents) of a different music category are provided (S10). As a result, it is possible, as indicated at point P3 of FIG. 4, for example, to improve passenger feelings α to pleasant feelings by time t3 and provide passengers with optimum automatic song service. Provision of music contents while simultaneously estimating passenger feelings α is thereafter continued in the same manner.

On the other hand, when, as indicated at point P4 of FIG. 4, for example, passenger feelings α do not improve (positive passenger feelings α fail to emerge) notwithstanding that music contents were changed, change of music contents is again instructed to switch from the second contents to still other music contents (third contents). In this case, the third contents are decided, for example, in line with degree of unpleasant passenger feelings or in line with degree of worsening of passenger feelings α from those at time t1 or worsening of passenger feelings α from those at immediately preceding time t2.

When unpleasant passenger feelings emerge, the controller 10 sometimes discontinues provision of music contents instead of changing music contents (S10). For example, when degree of the unpleasant feelings is equal to or greater than second predetermined value at time t2, provision of music contents is discontinued. When provision of soft music helps to improve passenger feelings α but not enough to make them positive, this is taken to mean that passengers want a still quieter ambience and provision of music contents is discontinued.

The present embodiment can achieve advantages and effects such as the following:

(1) The onboard unit 1, which is an example of the content providing apparatus, includes the biometric information acquiring unit 20 that acquires biometric information such as passenger facial expressions and/or utterances, the feeling estimating unit 11 that estimates passenger feelings based on biometric information acquired by the biometric information acquiring unit 20, the content instructing unit 12 that instructs acquisition of music contents based on passenger feelings estimated by the feeling estimating unit 11, the content acquiring unit 14 that acquires music contents instructed by the content instructing unit 12, and the content output unit 15 that outputs music contents acquired by the content acquiring unit 14 to passengers (FIGS. 2A and 2B). After the content output unit 15 outputs first contents, the content instructing unit 12 instructs change of music contents from the first contents to second contents depending on passenger feelings estimated by the feeling estimating unit 11 (S9).

Therefore, when music contents (first contents) provided in line with passenger feelings turn out to be unsuitable for the passengers and passengers experience displeasure, change to other musical contents (second contents) is automatically instructed in line with the displeasure. So passenger feelings can be easily and rapidly ameliorated without need for passengers to designate contents by manually operating the operation unit 21. In other words, as illustrated for example in FIG. 5, the content providing apparatus according to the present embodiment responds to gradual worsening of passenger feelings α with passage of time following provision of music contents in line with passenger feelings at time t1 (point P1) by instructing change of music contents when degree of passenger feelings is α1 at time t2 (point P2). This enables rapid improvement of passenger feelings α without further worsening of passenger feelings α. In contrast, when, for example, a passenger requests change of music contents manually or by voice after experiencing displeasure, change of music contents is instructed at time t4 later than time t2. Degree of passenger unpleasant feelings therefore progresses from α1 to still larger α2 (point P5), i.e., passenger displeasure intensifies, with no improvement of passenger feelings in the time range between t2 and t4.

(2) When passenger feelings estimated by the feeling estimating unit 11 after the content output unit 15 outputs first contents are found to exhibit worsening, the content instructing unit 12 instructs change of music contents from the first contents to second contents (S6→S9). As a result, change of music contents can be instructed when improvement of passenger feelings is necessary, and change of music contents can be instructed at a suitable time.

(3) The onboard unit 1 is additionally equipped with the operation unit 21 for manually instructing acquisition of music contents and the line-of-sight determining unit 13 for determining based on a signal from the camera 22 whether a passenger is looking toward the operation unit 21 (FIGS. 2A and 2B). When passenger feelings estimated by the feeling estimating unit 11 after the content output unit 15 outputs first contents are found to exhibit worsening and the line-of-sight determining unit 13 determines that a passenger is looking toward the operation unit 21, the content instructing unit 12 instructs change of music contents from the first contents to second contents (S7→S8→S9). Since whether the emergence of passenger displeasure was caused by the automatic provision of music contents or is attributable to some other reason can therefore be determined, unnecessary change of music contents can be avoided.

(4) The content instructing unit 12 instructs change of music contents from the first contents to second contents in accordance with change of passenger feelings estimated by the feeling estimating unit 11 after passage of predetermined time Δt1 following output of the first contents by the content output unit 15. Since this makes it possible to accurately estimate change of passenger feelings owing to the provision of music contents, music contents can be optimally changed in line with passenger feelings.

(5) The content instructing unit 12 is additionally able to instruct discontinuance of music contents acquisition in line with passenger feelings estimated by the feeling estimating unit 11 after the content output unit 15 outputs the first contents, and when the content instructing unit 12 instructs that contents acquisition be discontinued, the content output unit 15 stops outputting music contents to the passengers (S10). This enables adaptation to passenger (driver) feelings when, for example, the driver wants to concentrate on driving in a quiet ambience.

(6) The contents instructed by the content instructing unit 12 are music contents, and the content instructing unit 12 responds to passenger feelings estimated by the feeling estimating unit 11 after the content output unit 15 outputs first contents by instructing acquisition of second contents of the same genre as the first contents or of second contents of a different genre from the first contents (S9). Therefore, since whether the genre of the music contents should be changed is decided in line with passenger feelings in this manner, passenger feelings can be favorably improved.

(7) The content providing method according to the present embodiment includes: using the biometric information acquiring unit 20 to acquire passenger biometric information and estimating passenger feelings based on the acquired biometric information (S1), designating or instructing to acquire contents based on the estimated passenger feelings (S2), acquiring the instructed contents (S3), and outputting the acquired contents to passengers (S4). In addition, the instructing of contents includes: estimating passenger feelings after output of first contents to passengers (S6) and instructing change of contents from the first contents to second contents in line with estimated passenger feelings (S9). Owing to this configuration, even when performance of automatic song selection service for passengers leads to passengers experiencing displeasure, the displeasure can be rapidly ameliorated.

(8) The content providing system 100 according to the present embodiment is equipped with the onboard unit 1 and the server unit 2 for providing music contents to the onboard unit 1 in accordance with instructions from the aforesaid onboard unit 1 (FIG. 1). This configuration ensures enhanced passenger enjoyment by enabling provision of music contents optimally suited to passenger feelings from among the music contents delivered from the server unit 2.

Figure 6:
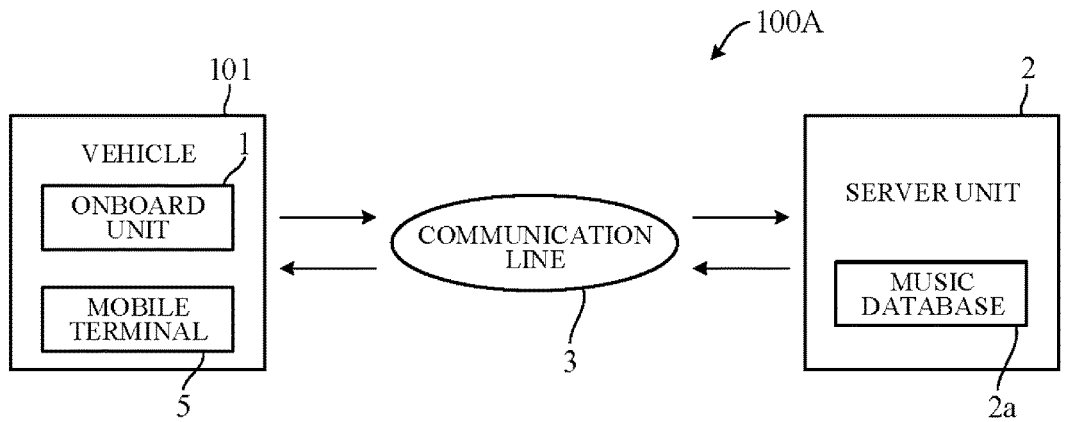
FIG. 6 is a diagram showing a modification of FIG. 1.

Various modifications of the aforesaid embodiment are possible. Some examples are explained in the following. FIG. 6 is a diagram showing a modification of the content providing system of FIG. 1. FIG. 6 shows a content providing system 100A comprising an onboard unit 1, a mobile terminal 5, and a server unit 2. The mobile terminal 5 is a smartphone, tablet terminal or other passenger-portable device having a communication unit capable of communicating with the onboard unit 1 and a communication unit capable of communicating with the server unit 2 through the communication line 3. This configuration enables the onboard unit 1 to communicate with the server unit 2 through the mobile terminal 5 and the communication line 3. Alternatively, the content providing apparatus can be constituted by the mobile terminal 5 without the onboard unit 1. In other words, the mobile terminal 5 can be configured to incorporate functions of the onboard unit 1.

Figure 7:
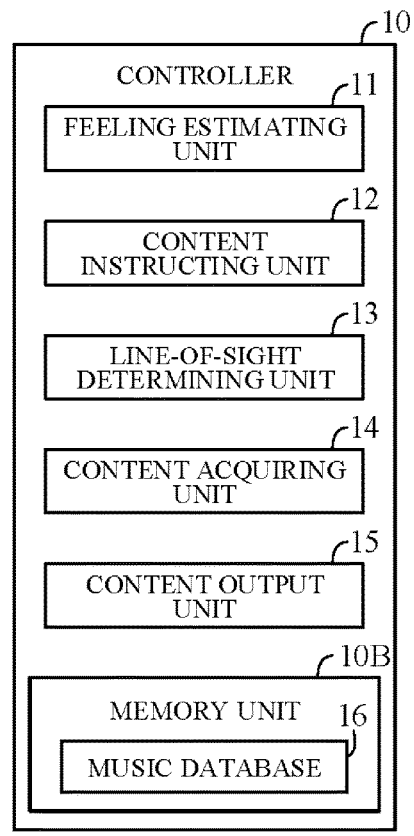
FIG. 7 is a diagram showing a modification of FIG. 2B.

FIG. 7 is a diagram showing a modification of the configuration of FIG. 2B. In FIG. 7, a memory unit 10B of a controller 10 of an onboard unit 1A has a music database 16. The music database 16 stores music data similar to the music data stored in the music database 2a of FIG. 1. With this configuration, music data corresponding to music contents designated by the content instructing unit 12 can be acquired from the memory unit 10B instead of the server unit 2, so that need to communicate with the server unit 2 is eliminated. In this case, music data stored in the music database 16 can be updated as required.

In the aforesaid embodiment, passenger biometric information is acquired by the biometric information acquiring unit 20 including the camera 22 and the microphone 23, but the biometric information unit is not limited to this configuration. For example, an arrangement can be adopted in which passenger biometric information, including pulse, blood pressure, body temperature, blood oxygen concentration and the like, is acquired using a wearable terminal borne by the passenger. Also possible is to acquire passenger body temperature (e.g., face temperature) as biometric information using thermography. Although the feeling estimating unit 11 estimates passenger emotions (feelings) by matching with Plutchik's wheel of emotions in the aforesaid embodiment, the feeling estimating unit is not limited to the aforesaid configuration and passenger feelings can instead be estimated by matching with other categorized emotion patterns.

In the aforesaid embodiment, the content instructing unit 12 instructs acquisition of music contents based on passenger feelings estimated by the feeling estimating unit 11, but the content instructing unit is not limited to this configuration and can instead be configured not only to instruct acquisition of music contents but also to instruct acquisition of voice contents offered by various voice services, moving pictures, still pictures and other image contents, and contents of other types. In the aforesaid embodiment, the content acquiring unit 14 acquires contents from the server unit 2, but the content acquiring unit is not limited to this configuration and can instead be configured to acquire contents from the memory unit 10B (FIG. 7) mounted in the vehicle 101. In the aforesaid embodiment, the content output unit 15 outputs contents acquired by the content acquiring unit 14 from the speaker 25, but the content output unit is not limited to this configuration and can instead be configured to output from the display unit 26, for example.

In the aforesaid embodiment, change from first contents to second contents among acquired contents is instructed based on passenger feelings estimated by the feeling estimating unit 11 after the content output unit 15 outputs the first contents. Namely, one or the other between change of music contents within the same music genre and change of the music genre is instructed, but it is possible instead to respond to estimation of displeasure solely by switching music genres. Instructions additional to the content change instruction are also possible and, for example, increase/decrease of speaker volume and the like can be instructed. Speaker volume can be reduced instead of discontinuing output of music contents.

In the aforesaid embodiment, acquisition of contents can be manually instructed by operating the operation unit 21, but the operation unit serving as a manual instructing unit can be of any configuration. For example, a manual instructing unit can be configured as a switch provided on the steering wheel. In the aforesaid embodiment, the line-of-sight determining unit 13 is adapted to determine whether a passenger is looking toward the operation unit 21 based on passenger line of sight acquired by the camera 22, but the line-of-sight determining unit for determining whether a passenger is looking toward the manual instructing unit is not limited to this configuration. The line-of-sight determining unit can be omitted. In the aforesaid embodiment, change to second contents is instructed in line with passenger feelings at predetermined time Δt1 after output of first contents, but change of contents can instead be instructed in line with passenger feelings without waiting a predetermined time.

The above embodiment can be combined as desired with one or more of the above modifications. The modifications can also be combined with one another.

According to the present invention, since the contents provided to the passenger are changed to other contents in accordance with the passenger feeling when it is determined to make the passenger unpleasant, the unpleasant feeling of the passenger can be rapidly ameliorated.

Above, while the present invention has been described with reference to the preferred embodiments thereof, it will be understood, by those skilled in the art, that various changes and modifications may be made thereto without departing from the scope of the appended claims.

What is claimed is:

1. A content providing apparatus, comprising:
a sensor configured to acquire biometric information of a passenger;
a switch configured to instruct to acquire content in accordance with a manual operation; and
a CPU and a memory coupled to the CPU, wherein the CPU and the memory are configured to perform:
estimating a passenger feeling based on the biometric information acquired by the sensor;
instructing to acquire the content based on the passenger feeling estimated;
acquiring the content instructed to be acquired;
outputting the content to the passenger;
determining whether the passenger feeling estimated after the content is output is worse;
determining whether the passenger looks toward the switch based on the biometric information acquired by the sensor; and
instructing to change the content to be acquired from first content to second content when it is determined that the passenger looks toward the switch after it is determined that the passenger feeling estimated after the first content is output is worse.

2. The content providing apparatus according to claim 1, wherein the CPU and the memory are further configured to perform:
instructing to change the content to be acquired from the first content to the second content, in accordance with a change of the passenger feeling estimated after a predetermined time passes from an output of the first content.

3. The content providing apparatus according to claim 1, wherein the CPU and the memory are further configured to perform:
instructing to stop acquiring the content, in accordance with the passenger feeling estimated after the first content is output; and
stopping outputting the content to the passenger when it is instructed to stop acquiring the content.

4. The content providing apparatus according to claim 1, wherein
the content is music content, wherein the CPU and the memory are further configured to perform:
instructing to acquire the second content of a genre identical with the first content or the second content of a genre different from the first content, in accordance with the passenger feeling estimated after the first content is output.

5. A content providing method, comprising:
acquiring biometric information of a passenger;
estimating a passenger feeling based on the biometric information;
instructing to acquire content based on the passenger feeling estimated;
acquiring the content instructed to be acquired;
outputting the content to the passenger;
determining whether the passenger feeling estimated after the content is output is worse;
determining whether the passenger looks toward a switch for instructing to acquire the content in accordance with a manual operation based on the biometric information; and
instructing to change the content to be acquired from first content to second content when it is determined that the passenger looks toward the switch after it is determined that the passenger feeling estimated after the first content is output is worse.

6. The content providing method according to claim 5, wherein:
the instructing comprises instructing to change the content to be acquired from the first content to the second content, in accordance with a change of the passenger feeling estimated after a predetermined time passes from an output of the first content.

7. The content providing method according to claim 5, further comprising:
instructing to stop acquiring the content, in accordance with the passenger feeling estimated after the first content is output; and
stopping outputting the content to the passenger when it is instructed to stop acquiring the content.

8. The content providing method according to claim 5, wherein
the content is music content, and the method further comprises:
instructing to acquire the second content of a genre identical with the first content or the second content of a genre different from the first content, in accordance with the passenger feeling estimated after the first content is output.

\* \* \* \* \*